June 30, 1970 — M. H. SHAMOS ETAL — 3,518,009

COLORIMETER FLOW CELL

Filed Aug. 18, 1966

INVENTORS.
WILLIAM J. SMYTHE
MORRIS H. SHAMOS
BY
ATTORNEY

United States Patent Office 3,518,009
Patented June 30, 1970

3,518,009
COLORIMETER FLOW CELL
Morris H. Shamos, New York, and William J. Smythe, Rye, N.Y., assignors to Technicon Corporation, a corporation of New York
Filed Aug. 18, 1966, Ser. No. 573,236
Int. Cl. G01j *3/46;* G01n *1/10*
U.S. Cl. 356—181                    7 Claims

ABSTRACT OF THE DISCLOSURE

The colorimeter flow cell for liquid sample analysis comprises a transparent tubular member having a light-reflecting inner surface. Light input and output apertures are defined in nonaligned fashion in the light-reflecting inner surface and in a plane transverse to the longitudinal axis of the tubular member. Accordingly, light directed into the light input aperture is subjected to multiple reflections along such plane before passing through the output aperture whereby the effective length of the flow cell is increased.

---

This invention relates to apparatus for the quantitative analysis of liquids in respect to a known ingredient therein, and more particularly to a novel colorimeter flow cell. Such apparatus is shown, for example, in U.S. Pat. Nos. 2,797,149, 2,879,141 and 3,241,432 to Leonard T. Skeggs, assigned to the assignee of the present invention.

In U.S. patent application Ser. No. 542,888, filed Apr. 14, 1966 by us, as joint inventors, there is disclosed a vertically disposed colorimeter flow cell in which the treated sample stream segmented by air or other inert gas or liquid flows upwardly across a beam of light which passes transversely through the flow cell to a photo-electric detector. Since the air or gas bubbles should occlude the lumen of the flow cell, the internal diameter of the flow cell is necessarily sufficiently small, for example, but without strict limitation, about 1.9 mm. For this reason, the path of light through the liquid is correspondingly small.

It has been proposed heretofore to provide tubular flow cells in which the light transmitted to the flow cell, for measuring the concentration of the known ingredient by measuring the light transmittance of the liquid under analysis while it flows through the cell, is reflected back and forth in multi-pass fashion through the liquid transversely of the liquid-flow path, thereby increasing the effective length of the light path through the liquid and correspondingly increasing the sensitivity of the light detector of the colorimeter.

In accordance with the present invention and pursuant to the primary object thereof, a multi-pass action of light through the liquid is accomplished in a simple and convenient way. More specifically, the flow cell of the present invention is in the form of tube having a liquid inlet and a liquid outlet, spaced from each other longitudinally of the tube, and a light inlet and a light outlet which are spaced from each other about 90° peripherally of the tube in a region intermediate the liquid inlet and liquid outlet, and the outer surface of the tube has a light reflective coating at least in said intermediate region of the tube.

In the following more specific description of the invention reference will be made to the following drawings which are illustrative of the presently preferred mode of practicing the invention:

Figures 1, 2:
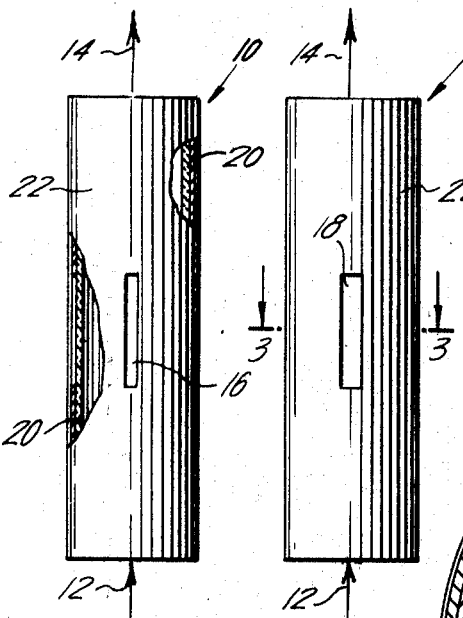
FIG. 1 is a greatly enlarged side view of the flow cell showing the light inlet.
FIG. 2 is a greatly enlarged view of the flow cell looking at the right of FIG. 1, showing the light outlet.

As illustrated by FIGS. 1 and 2, the flow cell 10, which is preferably a tubular glass member, is preferably vertically positioned. It has a lower liquid inlet 12 and an upper liquid outlet 14, and is otherwise closed so that liquid under analysis flows upwardly through the cell from inlet 12 to and out of outlet 14.

A light inlet 16 and a light outlet 18 are provided in a region of the tube intermediate the longitudinally liquid inlet and outlet. The outer peripheral surface of the cell is covered with a film-coating 20 of silver or other suitable light-reflective material, except at the light inlet 16 and the light outlet 18 which are in the form of narrow longitudinal slits. The silver coating 20 is covered by a thin protective coating 22, preferably nitro-cellulose applied in liquid solution thereof and allowed to dry on the silver coating.

Flow cell 10 is of small size, especially when used for colorimetric analysis in clinical chemistry. As a non-limitative example of the cell dimensions, said cell is 25 mm. in length, its inner diameter is 1.9 mm., its outer diameter is 3.0 mm. The light inlet slit 16 is about 10 mm. in length and about 0.2 mm. in width. The light outlet slit 18 is about 1 mm. in width and about 10 mm. in length. These slits 16 and 18 are formed by removal of the coatings 20 and 22 to define the slits, the rest of the peripheral surface of the cell having said coatings intact.

Figure 3:
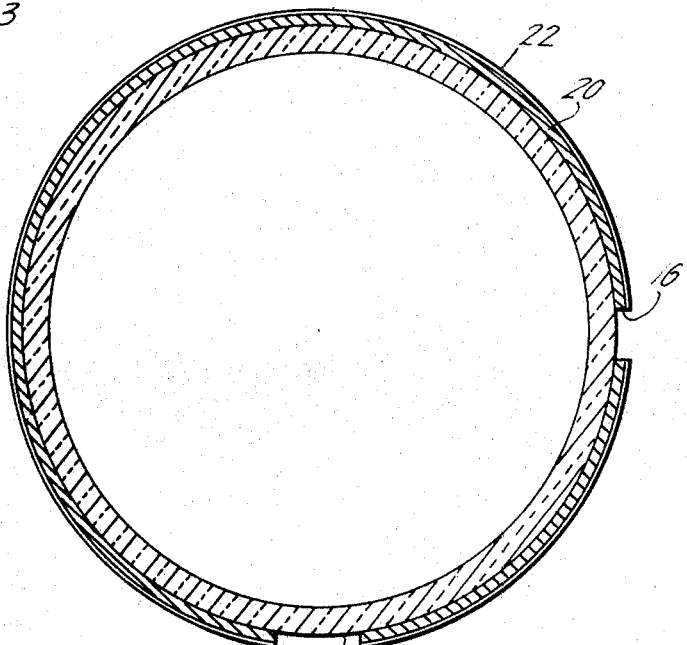
FIG. 3 is a further enlarged sectional view on the line 3—3 of FIG. 2.

In the illustrated embodiment of the invention (FIG. 3) slits 16 and 18 are not opposite each other but are preferably at right angles to each peripherally of the cell. Light which enters the cell from the light source 24 (FIG. 4), subsequently more specifically referred to, is reflected back and forth in multi-pass fashion through the liquid, as it flows through the cell, transversely of the liquid-flow direction, exits through the slit 18 and impinges on the photo-electric detector 26 of the colorimeter for controlling the stylus of the recorder 28 as described, for example, in U.S. Pat. No. 3,031,917 to Milton H. Pelavin or in the above-mentioned Skeggs patents. While the ninety degree displacement of the light outlet from the light inlet is preferred, these relative positions of the light inlet and light outlet are not critical but can vary to a considerable degree so long as the light path through the cell is transverse of longitudinal axis of the tubular cell and the light inlet and outlet are out of alignment with each other diametrically of the cell so that the light which enters the cell is reflected back and forth within the cell before passing through the light outlet.

Figure 4:
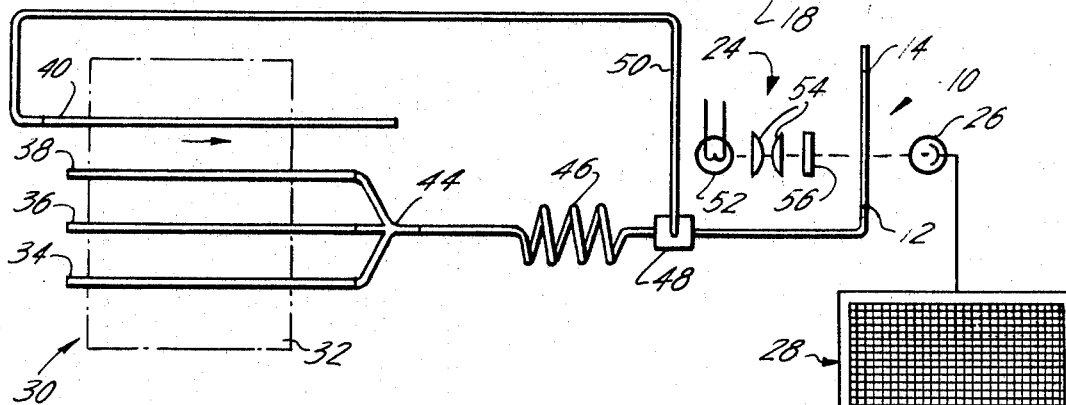
FIG. 4 is a more or less diagrammatic view of liquid analysis apparatus provided with a flow cell according to the invention.

Referring now more in detail to FIG 4, there is shown diagrammatically a pump 30, which can be of any suitable type but which is preferably of the type shown by the U.S. Pat. No. 2,935,028. Briefly described, such pump comprises a platen 30 against which a plurality of resiliently compressible tubes, here shown as tubes 34, 36, 38 and 40, are compressed progressively along their lengths in the direction of arrow by pressure rollers (not shown).

In the operation of the apparatus, the liquid sample or samples are supplied from the sampler (not shown) to the pump tube 34 and through the latter to a fitting 44, to which a reagent liquid is supplied by pump tube 36, and to which air or other gas inert to the liquids is transmitted by pump tube 38. The air separats the liquid which enter fitting 44 into alternate segments of liquids separated by intervening segments of the gas which has a cleansing action on the tubing as described in the above-mentioned Skeggs Pat. No. 2,797,149. From the fitting 44 the segmentized fluid stream passes through a horizontal mixing coil 46.

In accordance with the present invention and as described in the above-identified application, the fluid stream, including the treated liquid and the air or other gas bubbles preferably flow from the mixing coil 46 to the inlet 12 of the flow cell, the debubbler 48 shown in FIG. 4 being omitted. When said debubbler is omitted and the segmentized fluid stream is transmitted to the flow cell without abstraction of the air or other gas segments from the fluid stream, the operation of the recorder stylus is preferably, but not necessarily, interrupted when the air segments traverse the light path, as described in the above-mentioned application. However, as illustrated by FIG. 4, it is within the scope of our present invention to abstract the air bubbles and for that purpose to interpose a gas debubbler 48 in the conduit upstream of the inlet to the flow cell. In said gas debubbler 48 the gas segments are removed as described in the U.S. patent to Leonard T. Skeggs No. 3,109,714. The pump tube 40 is connected to the debubbler 48 by a tube 50 and aspirates the gas bubbles from the debubbler, along with a negligible quantity of liquid to waste, while substantially all of the liquid flows to the inlet 12 of the flow cell. A liquid which is immiscible with and inert to the sample and reagent liquids may be used instead of air and transmitted through tube 38 for the segmentizing operation and may flow through the flow cell with the treated samples as described, for example, in our U.S. patent application, Ser. No. 542,488 filed Apr. 14, 1966. The light source comprises an electric lamp, light focusing lens means 54 and an optical light filter, indicated at 56, for transmitting light of the desired wave length to the light inlet 16 of the flow cell. Flow cell 10 may be disposed horizontally instead of vertically. Also the light reflecting coating may be on the inner peripheral surface of cell 10 instead of on the outer surface thereof and with a thin protective coating of Teflon, which is light transparent, overlying said light-reflecting coating for preventing access of the fluid stream thereto.

It will be understood by those skilled in the art that the analysis apparatus as illustrated by FIG. 4 is only schematically shown and may include various devices in addition to those indicated. For example, the apparatus may include a heating bath, a dialyzer or a filter, etc., but since the present invention is concerned only with the flow cell 10, it is deemed unnecessary to describe the analysis apparatus in greater detail.

While we have shown and described the preferred embodiments of our invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. A colorimeter flow cell for testing the optical density of a liquid comprising a tubular transparent member having a longitudinal axis and having a liquid inlet and a liquid outlet in spaced relation, means connected to said liquid inlet and outlet for directing liquid through said tubular member, a part of said tubular member intermediate said liquid inlet and outlet having a light reflective peripheral surface, and a light inlet and a light outlet in peripherally spaced relation and defined in said reflective surface so as to be out-of-alignment with each other and in a plane transverse to said longitudinal axis, means for directing light through said light inlet and along said plane, such that light passing into said tubular member through said light inlet is reflected back and forth in multi-pass fashion along said plane and through said liquid so as to pass through said light outlet, and means responsive to light passing through said light outlet for indicating the optical density of said liquid.

2. A colorimeter flow cell according to claim 1, wherein the light outlet is displaced about ninty degrees from the light inlet.

3. A colorimeter flow cell according to claim 1, wherein the light-reflective surface comprises a coating of light reflecting material on the outer surface of said intermediate part of the cell.

4. A colorimeter flow cell according to claim 3, wherein the light outlet is displaced about ninety degrees from the light inlet.

5. A colorimeter flow cell according to claim 1, wherein said tubular member is adapted to be positioned vertically and has lower and upper parts provided respectively with the liquid inlet and the liquid outlet.

6. Liquid analysis apparatus comprising a colorimeter flow cell including a tubular transparent member having a longitudinal axis and having a liquid inlet and a liquid outlet spaced from said liquid inlet, means for transmitting a fluid stream comprising segments of said liquid separated from each other by intervening segments of gas inert to said liquid through said tubular member, a part of said tubular member intermediate said liquid inlet and outlet having a light reflective peripheral surface, and a light inlet and a light outlet in peripherally spaced relation and defined in said reflective surface so as to be out-of-alignment with each other and in a plane transverse to said longitudinal axis, means for directing light through said light inlet and along said plane and transversely of the path of flow of said liquid through said tubular member, such that light passing into said tubular member and through said light inlet is reflected back and forth in multi-pass fashion along said plane and through said liquid segments when transmitted through said tubular member so as to pass through said light outlet, and means responsive to light passing through said light outlet for indicating the optical density of said liquid segments.

7. Liquid analysis apparatus according to claim 6, wherein the light outlet is displaced peripherally of the tubular member about ninety degrees from the light inlet.

References Cited

UNITED STATES PATENTS

| | | | |
|---|---|---|---|
| 2,775,159 | 12/1956 | Frommer | 356—103 |
| 2,909,960 | 10/1959 | Orr et al. | 356—103 |
| 3,036,492 | 5/1962 | Rao | 356—246 |
| 3,358,148 | 12/1967 | Conklin et al. | 356—104 |
| 3,418,053 | 12/1968 | Pelavin | 356—181 |

RONALD L. WIBERT, Primary Examiner

W. A. SKLAR, Assistant Examiner

U.S. Cl. X.R.

250—218; 356—246